Sept. 3, 1957 J. N. BRUCE 2,805,101
POSITIVE TRACTION DEVICE FOR AUTOMOBILE WHEELS
Filed July 20, 1955
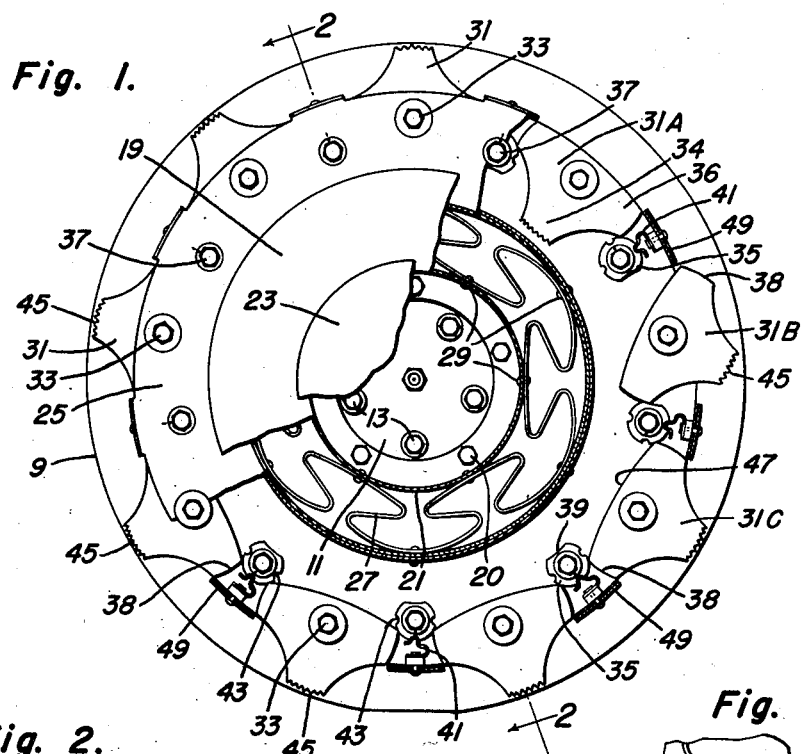
Fig. 1.
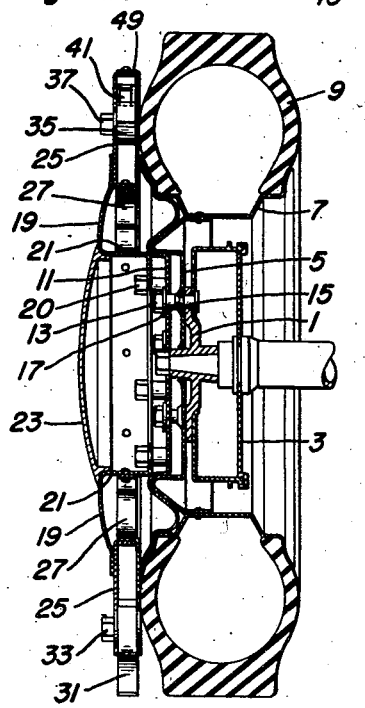
Fig. 2.
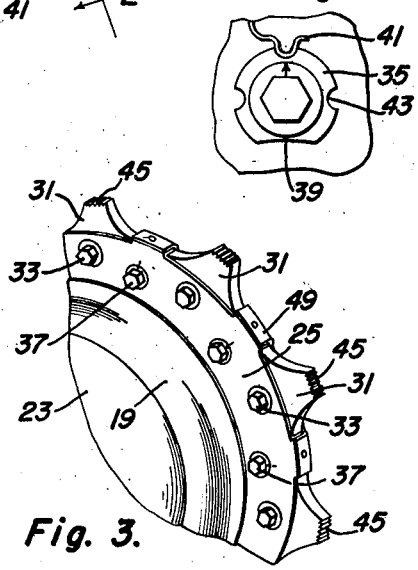
Fig. 3.
Fig. 4.
INVENTOR.
John N. Bruce
BY George Renehan
ATTORNEY

2,805,101
POSITIVE TRACTION DEVICE FOR AUTOMOBILE WHEELS

John N. Bruce, Bel Air, Md.

Application July 20, 1955, Serial No. 523,395

2 Claims. (Cl. 301—47)

(Granted under Title 35, U. S. Code (1952), sec. 266)

The invention described herein may be manufactured and used by or for the Government of the United States of America for governmental purposes without the payment to me of any royalty thereon.

This invention relates to a positive traction device for automobile wheels which may be permanently mounted on the wheel. Under ordinary driving conditions it may be so adjusted as to be inoperative and permit the tires to run on pavement with no interference. When, however, slippery, muddy, or snow covered roads are encountered, it can be adjusted in a few minutes time so as to bring into play positive traction lugs.

The device is also constructed in such a manner as to provide a resilient support for the lugs which will prevent the transmission of undue shocks to the vehicle.

In the accompanying drawing,

Fig. 1 is an elevation of a wheel having a traction device mounted thereon, parts being broken away to show internal structure.

Fig. 2 is a section taken on line 2—2 of Fig. 1.

Fig. 3 is a perspective view of the traction device showing the lugs in their operative position.

Fig. 4 is a detail view of a locking cam.

Referring to the drawing, I have shown my device mounted on a conventional automobile wheel comprising the usual hub 1, brake drum 3, wheel disk 5, rim 7 and tire 9.

My device includes an inner housing 11 which is secured to the hub by special nuts 13 which engage convenventional heel bolts 15. Nuts 13 replace the usual wheel nuts and engage wheel disk 5 at their inner ends. Each nut is provided with a shoulder 17 which engages inner housing 11. By use of these special nuts, the wheel disk is secured in place in the usual manner and the inner housing is clamped tightly against the wheel. The inner housing is so shaped as to conform closely to the outer contour of the wheel disk and rim. An outer housing 19 is fastened to inner housing 11 by bolts 20 and includes a cylindrical portion 21 of such size as to receive the conventional hub cap 23. A torus housing 25 is mounted between inner housing 11 and outer housing 19. It is spring supported on cylindrical portion 21 of the outer housing and has a sliding fit with the inner and outer housings. I prefer to employ a zigzag spring 27 which surrounds cylindrical portion 21 and which is tangential at alternate points to cylindrical portion 21 and torus housing 25. It is secured at those points by rivets 29.

Traction lugs 31 are mounted within torus housing 25 on rotatable axes terminating in heads 33. These lugs are T-shaped, comprising radially extending traction portions 34 and tangentially extending locking portions 36. They are rotatable from inoperative position 31A through intermediate position 31B to operative position 31C (Fig. 1), and are locked in their operative and inoperative positions by locking cams 35, which are rotatably mounted within the torus housing and terminate in heads 37. The cams 35 have a maximum diameter greater than the distance between the ends of adjacent lugs 31 and when in the proper position engage the undersides of the lugs and prevent their rotation. They are, however, so shaped that when in another position they permit rotation of the lugs.

While various specific arrangements may be employed, I prefer the following: The ends 38 of each lug 31 are arcuate and concentric with the axis of the lug. A portion 39 of the surface of cam 35 is concave and has substantially the same radius of curvature as portions 38. The cam so located that the concave portion 39 may be concentric with the axis of either of the two adjacent lugs. Thus, the cams may be turned, as shown in connection with lug 31B, so that the lugs may be turned from one position to another.

The cams engage spring catches 41, which enter notches 43 and serve to retain the cams in the desired position.

Preferably the heads of nuts 13 and bolts 20 as well as heads 37 of cams 35 are made to fit the same automobile lug wrench.

The top of each lug is provided with a serrated working surface 45 and the bottom 47 is preferably arcuate with the same radius of curvature as the outer circumference of torus housing 25. The axes of the lugs are so located that when the lugs are turned to the operative position shown at 31A, Fig. 1, and in Fig. 3, the serrated working surfaces 45 are located approximately at the periphery of tire 9, so that when the bottom of the tire is deformed under load the lugs will dig into the road surface. When the lugs are turned to their inoperative position, 31A (Fig. 1), arcuate portions 47 lie on the circumference of torus housing 25, which includes cross-members 49 closing the spaces between the lugs. These cross pieces may also carry spring catches 41, referred to above.

In use, my traction device may be permanently mounted on the wheel. Under normal driving conditions the lugs are turned to their inoperative position and locked by cams 35. Should conditions be encountered where additional traction is necessary, as in snow, ice, mud, etc. the lugs may in a few minutes be turned to their operative positions. The springs 27 serve to absorb shocks caused by striking stones or other obstructions. When it is necessary to change a tire the entire traction device may be taken off as a unit by removing nuts 13 or the outer and inner housings may be successively removed by first unscrewing bolts 20 and removing the outer housing, then unscrewing nuts 13 and removing the inner housing.

While I have described my device in detail, it will be understood that various changes are possible. I therefore wish my invention to be limited solely by the scope of the appended claims.

I claim:

1. A positive traction device for automobile wheels comprising an inner housing shaped to fit the rim, wheel disk and hub of an automobile wheel and adapted to be fastened to said hub; an outer housing mounted on said inner housing, one of said housings comprising a cylindrical portion concentric with the axis of said housings and having a diameter not greater than said wheel disk, said outer housing including an annular portion extending outwardly from said cyclindrical portion to a point adjacent to the rim of said wheel, said annular portion being spaced from said inner housing; a torus housing having a sliding fit between said annular portion and said inner housing; a tortuous leaf spring encircling said cylindrical portion and resiliently supporting said torus housing; traction lugs rotatably mounted on said torus housing, said lugs being rotatable from an operative position wherein they project to points approximately on the circumference of the tire to an inoperative position wherein they are spaced a substantial distance radially inward of said circumference, each of said traction lugs comprising a radially extending traction portion and a circumferentially extending locking portion, the locking portion of successive lugs extending into proximity with each other; and means for locking said lugs in their operative and inoperative positions.

2. A traction device as defined in claim 1 wherein each of said lugs is rotatable about an axis, each of said locking portions has an arcuate end surface substantially concentric with said axis and wherein each of said locking means includes a rotatable cam engaging the locking portions of two successive traction lugs and having a diameter greater than the distance between the locking portions of successive traction lugs so that each of said cams prevents rotation of said lugs and each of said cams has a cutout portion so shaped as to have substantially the same radius of curvature as said end surfaces, so that when two successive cams are rotated to a position where said cutout portions and the adjacent end surfaces of one of said lugs are substantially concentric said lug may be rotated to different positions.

References Cited in the file of this patent

UNITED STATES PATENTS

| | | |
|---|---|---|
| 1,576,570 | Busch | Mar. 16, 1926 |
| 2,207,636 | Opperman | July 9, 1940 |
| 2,540,147 | Sutherland | Feb. 6, 1951 |

FOREIGN PATENTS

| | | |
|---|---|---|
| 357,061 | Germany | Oct. 28, 1919 |